US012587812B2

(12) United States Patent
Liu et al.

(10) Patent No.: US 12,587,812 B2
(45) Date of Patent: Mar. 24, 2026

(54) METHOD FOR SWITCHING TRANSMISSION MODE AND CORE NETWORK ELEMENT

(71) Applicant: InterDigital Patent Holdings, Inc., Wilmington, DE (US)

(72) Inventors: Jianhua Liu, Guangdong (CN); Qianxi Lu, Guangdong (CN); Haorui Yang, Guangdong (CN); Shukun Wang, Guangdong (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 537 days.

(21) Appl. No.: 17/853,420

(22) Filed: Jun. 29, 2022

(65) Prior Publication Data

US 2022/0329985 A1  Oct. 13, 2022

Related U.S. Application Data

(63) Continuation of application No. PCT/CN2020/070142, filed on Jan. 2, 2020.

(51) Int. Cl.
| | |
|---|---|
| *H04W 4/06* | (2009.01) |
| *H04W 28/02* | (2009.01) |
| *H04W 72/1263* | (2023.01) |
| *H04W 76/22* | (2018.01) |

(52) U.S. Cl.
CPC ......... *H04W 4/06* (2013.01); *H04W 28/0268* (2013.01); *H04W 72/1263* (2013.01); *H04W 76/22* (2018.02)

(58) Field of Classification Search
USPC ....... 370/252, 312, 328, 329, 340, 341, 342, 370/390, 431, 432
See application file for complete search history.

(56) References Cited

U.S. PATENT DOCUMENTS

| | | | |
|---|---|---|---|
| 2008/0069071 A1 | 3/2008 | Tang | |
| 2009/0196213 A1* | 8/2009 | Zhong ................ | H04L 12/1868 370/312 |
| 2020/0267513 A1* | 8/2020 | Zhu ........................ | H04W 4/06 |
| 2020/0323024 A1 | 10/2020 | Huang et al. | |

(Continued)

FOREIGN PATENT DOCUMENTS

| | | |
|---|---|---|
| CN | 109547944 A | 3/2019 |
| CN | 110167190 A | 8/2019 |

(Continued)

OTHER PUBLICATIONS

Supplementary European Search Report in European application No. 20909196.6, mailed on Dec. 9, 2022.

(Continued)

*Primary Examiner* — Nguyen H Ngo
(74) *Attorney, Agent, or Firm* — Volpe Koenig

(57) ABSTRACT

The present application refers to a method for switching transmission mode and a core network element. The method includes: a core network element sends first indication information to a user plane function entity, the first indication information being used to indicate to send, to a shared channel, multicast data corresponding to a terminal device; and the core network element sends second indication information to an access network element, the second indication information being used to indicate the multicast data.

20 Claims, 15 Drawing Sheets

A core network element transmits third indication information to an RAN element, the third indication information is used to indicate that the terminal devices support multicast transmission
S200

The core network element transmits first indication information to an UPF entity, the first indication information is used to instruct to transmit multicast data corresponding to terminal devices to a shared channel
S201

The core network element transmits second indication information to a radio access network (RAN) element, the second indication information is used to indicate multicast data
S202

(56)        References Cited

U.S. PATENT DOCUMENTS

2020/0344576 A1* 10/2020 Li ............................ H04W 4/06
2021/0076164 A1*  3/2021 Navratil .................. H04W 4/06
2021/0076166 A1*  3/2021 Navratil .................. H04W 4/08
2022/0132627 A1    4/2022 Huang et al.

FOREIGN PATENT DOCUMENTS

EP          3678390  A1     7/2020
EP          3723395  A1    10/2020
WO        2019129212 A1     7/2019

OTHER PUBLICATIONS

Nokia et al., "PDU Session Enhanced for Multicast to Provide the
Basic Multicast Connectivity Service", SA WG2 Meeting #82-136
S2-1911366, Nov. 8, 2019 (Nov. 8, 2019).
International Search Report in the international application No.
PCT/CN2020/070142, mailed on Sep. 24, 2020.
Written Opinion of the International Search Authority in the inter-
national application No. PCT/CN2020/070142, mailed on Sep. 24,
2020.

* cited by examiner

100

Figure 3:
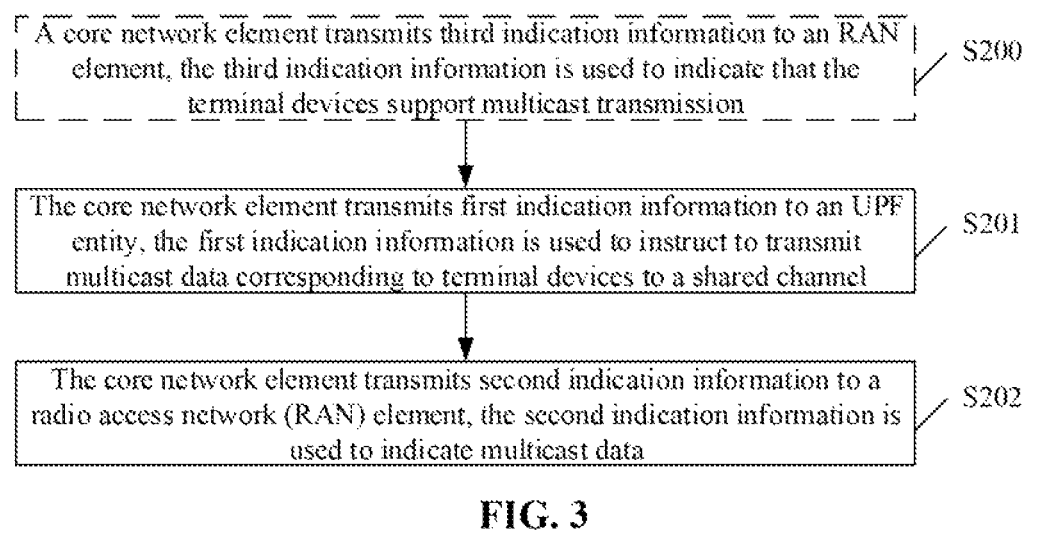

A core network element transmits third indication information to an RAN element, the third indication information is used to indicate that the terminal devices support multicast transmission

S200

The core network element transmits first indication information to an UPF entity, the first indication information is used to instruct to transmit multicast data corresponding to terminal devices to a shared channel

S201

The core network element transmits second indication information to a radio access network (RAN) element, the second indication information is used to indicate multicast data

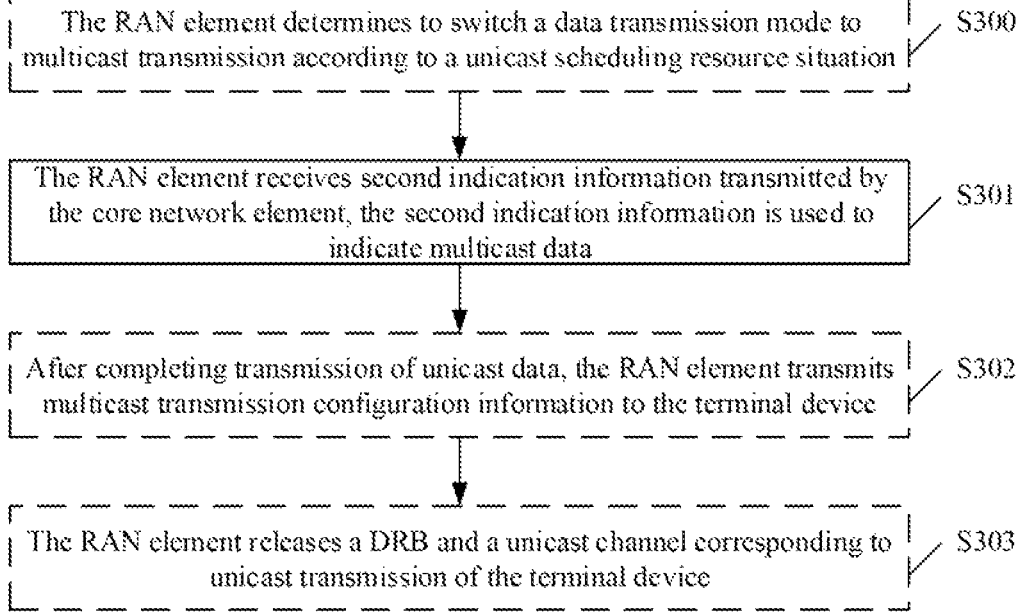

The RAN element determines to switch a data transmission mode to multicast transmission according to a unicast scheduling resource situation — S300

The RAN element receives second indication information transmitted by the core network element, the second indication information is used to indicate multicast data — S301

After completing transmission of unicast data, the RAN element transmits multicast transmission configuration information to the terminal device — S302

The RAN element releases a DRB and a unicast channel corresponding to unicast transmission of the terminal device — S303

FIG. 4

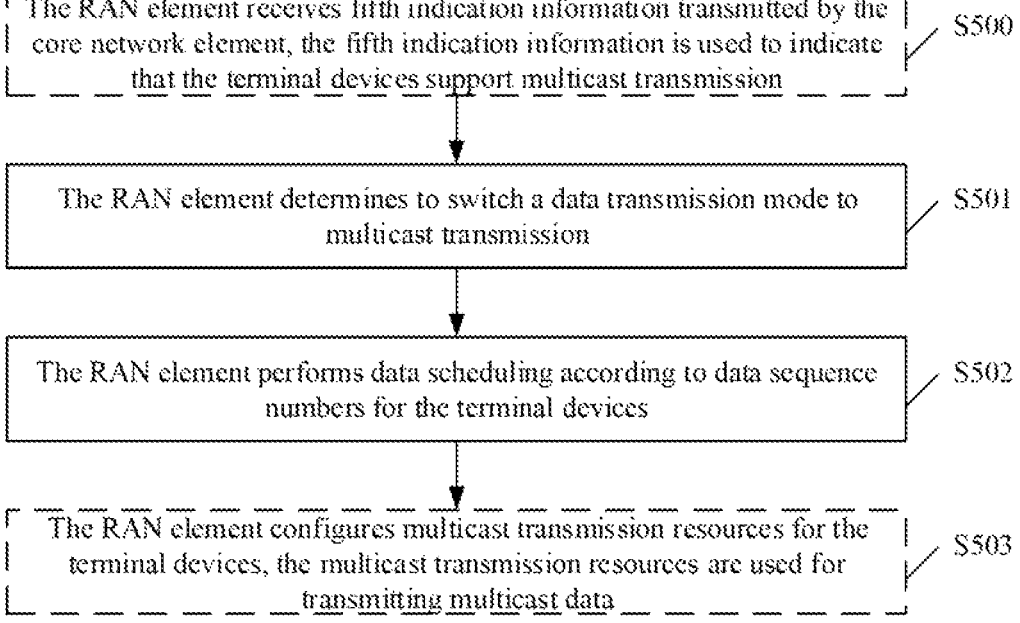

The RAN element receives fifth indication information transmitted by the core network element, the fifth indication information is used to indicate that the terminal devices support multicast transmission — S500

The RAN element determines to switch a data transmission mode to multicast transmission — S501

The RAN element performs data scheduling according to data sequence numbers for the terminal devices — S502

The RAN element configures multicast transmission resources for the terminal devices, the multicast transmission resources are used for transmitting multicast data — S503

FIG. 6

In a case where the core network element determines to switch a data transmission mode to unicast transmission, the core network element establishes a unicast transmission channel for each terminal device     S801

The core network element initiates a PDU session modification procedure to switch a session of the terminal device to a unicast session     S802

METHOD FOR SWITCHING TRANSMISSION MODE AND CORE NETWORK ELEMENT

CROSS-REFERENCE TO RELATED APPLICATION

The present application is a continuation of International Application No. PCT/CN2020/070142 filed on Jan. 2, 2020, the disclosure of which is hereby incorporated by reference in its entirety.

BACKGROUND

In the related art, a network device determines whether data of User Equipment (UE) may be transmitted in a unicast transmission manner or a multicast transmission manner. However, it is not clear how data transmission is switched from unicast transmission to multicast transmission or how data transmission is switched from multicast transmission to unicast transmission.

SUMMARY

The present disclosure relates to the field of wireless communication technologies, and in particular to a method for switching transmission mode and a core network element.

According to a first aspect, an embodiment of the present disclosure provides a method for switching transmission mode, which includes that: a core network element transmits first indication information to a user plane function (UPF) entity, the first indication information is used to instruct to transmit multicast data corresponding to terminal devices to a shared channel.

The core network element transmits second indication information to a radio access network (RAN) element, and the second indication information is used to indicate multicast data.

According to a second aspect, an embodiment of the present disclosure provides a method for switching transmission mode, which includes that: an RAN element receives second indication information transmitted by a core network element, the second indication information is used to indicate multicast data.

According to a third aspect, an embodiment of the present disclosure provides a core network element including a processor and a memory for storing a computer program executable on the processor, the processor is configured to execute the computer program to perform operations of the method for switching the transmission mode performed by the core network element.

BRIEF DESCRIPTION OF THE DRAWINGS

FIG. 3 is a schematic diagram of an optional processing flow of a method for switching transmission mode applied to a core network element according to an embodiment of the present disclosure.

FIG. 4 is a schematic diagram of an optional processing flow of a method for switching transmission mode applied to an RAN element according to an embodiment of the present disclosure.

FIG. 6 is a schematic diagram of another optional processing flow of a method for switching transmission mode applied to an RAN element according to an embodiment of the present disclosure.

DETAILED DESCRIPTION

In order to enable a more detailed understanding of the features and technical content of the embodiments of the present disclosure, the following describes in detail the implementation of the embodiments of the present disclosure with reference to the accompanying drawings, which are intended for illustration only and are not intended to limit the embodiments of the present disclosure.

Before the method for switching the transmission mode provided in the embodiment of the present disclosure is described in detail, the data transmission mode in the related art is briefly described.

Figure 1:
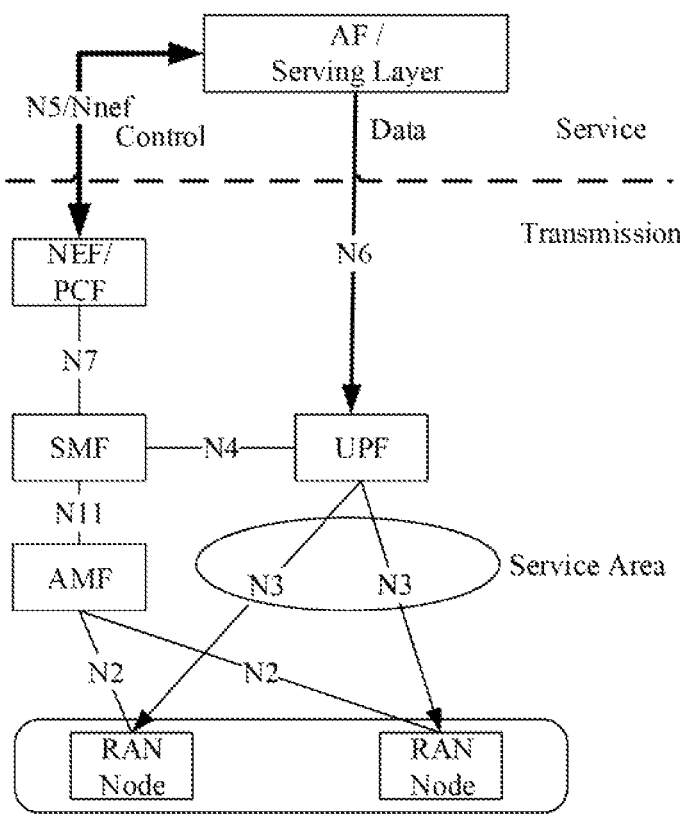
FIG. 1 is a network architecture diagram of a point-to-multipoint transmission mechanism of the present disclosure.

In a 5G system, a point-to-multipoint transmission mechanism is introduced. FIG. 1 illustrates the network architecture of the point-to-multipoint transmission mechanism. The network side transmits downlink data in a point-to-multipoint transmission manner in an area of a multicast service. A terminal device in the area of the multicast service receives data using a multicast channel.

The 5G system further supports a protocol data unit (PDU) connection service. The PDU connection service refers to a service for exchanging PDU data packets between the terminal device and a data network (DN). The PDU connection service is implemented by the terminal device initiating establishment of a PDU session. The establishment of one PDU session is the establishment of one data transmission channel between the terminal device and the DN.

Subscription information for each single network slice selection assistance information (S-NSSAI) may include a default data network name (DNN) and multiple DNNs. In a case where the terminal device does not provide the DNN of the S-NSSAI when initiating a PDU session establishment request, if the subscription information of the terminal device has a default DNN, the access and mobility management function (AMF) entity selects the default DNN for the S-NSSAI; and if the subscription information of the terminal device does not have the default DNN, the AMF entity selects a locally configured DNN for the S-NSSAI. In a case where the DNN carried in the S-NSSAI message by the terminal device initiating a PDU session establishment request is not supported by the network device, and the AMF entity fails to select an appropriate session management function (SMF) entity through querying Network Function (NF) repository function (NRF), the AMF entity will reject the PDU connection request and carry a cause value "DNN is not supported".

Each PDU session supports one type of PDU session, such as one of iPv4, IPv6, IPv4v6, Ethernet and Unstructured. The PDU session is established, modified, or released between the terminal device and the SMF entity through a Non-Access Stratum Session Management (NAS SM) signaling.

The network device may also trigger establishment of the PDU session. The procedure may be as follows. 1) When an application server is to establish a PDU session connection, the application server transmits an establishment request message to the core network element. 2) After receiving the establishment request message from the application server, the core network element transmits to a terminal device a message for triggering the establishment of the PDU session. 3) After receiving the message for triggering the establishment of the PDU session, the terminal device transmits the message for triggering the establishment of the PDU session to the corresponding application on the terminal device. 4) The application on the terminal device determines when to initiate the specified PDU session connection according to the content of the trigger message. For details, see section 5.2.6.1 in TS 23.502.

When the terminal device transmits a PDU session establishment request message to the network device, the terminal device needs to provide a PDU session ID. The PDU session ID is allocated by the terminal device and is unique within the terminal device. To support the handover between 3GPP access and non-3GPP access in different networks, the PDU session ID is stored in a unified data management (UDM) entity.

Regardless of it is the 3GPP access or the non-3GPP access, the terminal device establishes multiple PDU session connections connected to the same DN or multiple PDU session connections connected to different DNs. The terminal device may establish multiple PDU session connections to the same DN and may be connected to the DN through different UPFs. The SMF corresponding to each of the multiple PDU session connections established by the terminal device may be different. The information of the serving SMF for each PDU session is registered in the UDM entity. In the multicast data transmission procedure, when the terminal device establishes a PDU session, one PDU session is established for the same service. In the PDU session, both unicast data transmission of the service and multicast data transmission of the data can be supported.

In a data interface N3 between the core network and the radio access network (RAN), a specific N3 channel of a terminal device or a shared transmission channel can be adopted. The unicast data and the multicast data for the terminal device can be transmitted in the specific N3 channel. The shared transmission channel is shared by multiple terminals for data transmission, and the multiple terminals may belong to the same group.

In order to improve the efficiency of data transmission in the air interface, the network device can determine whether to adopt the unicast transmission or the multicast transmission, and the network device can further determine whether to switch a data transmission mode from the unicast transmission to the multicast transmission or from the multicast transmission to the unicast transmission.

Embodiments of the present disclosure provide a method for switching transmission mode. The method for switching the transmission mode according to the embodiments of the present disclosure can be applied to various communication systems, such as a global system of mobile communication (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, an advanced long term evolution (LTE-A) system, a new radio (NR) system, an evolved system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), a wireless fidelity (WiFi), a next generation communication system, or other communication systems.

In general, the number of connections supported by conventional communication systems is limited and connections supported by conventional communication systems are easy to implement. However, with the development of communication technologies, mobile communication systems will support not only conventional communication, but also support, for example, device-to-device (D2D) communication, machine-to-machine (M2M) communication, machine type communication (MTC), vehicle to vehicle (V2V) communication, and the like. The embodiments of the present disclosure can also be applied to these communication systems.

The system architecture and service scenarios described in the embodiments of the present disclosure are intended to describe the technical solutions of the embodiments of the present disclosure more clearly, and do not limit the technical solutions provided by the embodiments of the present disclosure. A person of ordinary skill in the art will appreciate that the technical solutions provided by the embodiments of the present disclosure are also applicable to similar technical problems with the evolution of the network architecture and the emergence of new service scenarios.

A network device according to an embodiment of the present disclosure may be an ordinary base station (such as a Node B, an eNB or a gNB), a new radio controller (NR controller), a centralized network element (centralized unit), a new radio base station, a radio remote module, a micro base station, a relay, a distributed network element (distributed unit), a transmission reception point (TRP), a transmission point (TP), or any other device. Embodiments of the present disclosure do not limit specific techniques and specific device configurations used by network devices. For convenience of description, in all embodiments of the present disclosure, the above-described apparatus for providing a wireless communication function for the terminal device is collectively referred to as a network device.

In the embodiment of the present disclosure, the terminal device may be any terminal, for example, the terminal device may be user equipment for machine type communication. That is, the terminal device may also be referred to as user equipment, a mobile station, a mobile terminal, a terminal, or the like. The terminal device which may communicate with one or more core networks via a radio access network (RAN). For example, the terminal device may be a mobile phone (or referred to as a cell phone), a computer having a mobile terminal, or the like. For example, the terminal device may also be a portable mobile device, a pocket-sized mobile device, a handheld mobile device, a computer built-in mobile device, or a vehicle-mounted mobile device that exchanges language and/or data with the radio access network, which is not specifically limited in the embodiment of the present disclosure.

In an embodiment, the network device and the terminal device may be deployed on land, which means that the network device and the terminal device may be deployed indoors or outdoors, and the network device and the terminal device may be a hand-held network device and a hand-held terminal device or a vehicle-mounted network device and a vehicle-mounted terminal device. The network device and the terminal device may also be disposed on the water surface. The network device and the terminal device may also be deployed on aircrafts, balloons and satellites in the air. The embodiments of the present disclosure do not limit application scenarios of the network device and the terminal device.

In an embodiment, the communication between the network device and the terminal device and the communication between the terminal device and the terminal device may be performed by using a licensed spectrum, or may be performed by using an unlicensed spectrum, or may be performed simultaneously by using a licensed spectrum and an unlicensed spectrum. The communication between the network device and the terminal device and the communication between the terminal device and the terminal device may be performed by using a spectrum lower than 7 gigahertz (GHz), or by using a spectrum higher than 7 GHz, or by using both a spectrum lower than 7 GHz and a spectrum higher than 7 GHz. Embodiments of the present disclosure do not limit spectrum resources used between the network device and the terminal device.

In general, the number of connections supported by conventional communication systems is limited and the connections supported by the conventional communication systems is easy to implement. However, with the development of communication technologies, mobile communication systems will support not only the conventional communication, but also support, for example, device-to-device (D2D) communication, machine-to-machine (M2M) communication, machine type communication (MTC), and vehicle to vehicle (V2V) communication, and the like. The embodiments of the present disclosure can also be applied to these communication systems.

Figure 2:
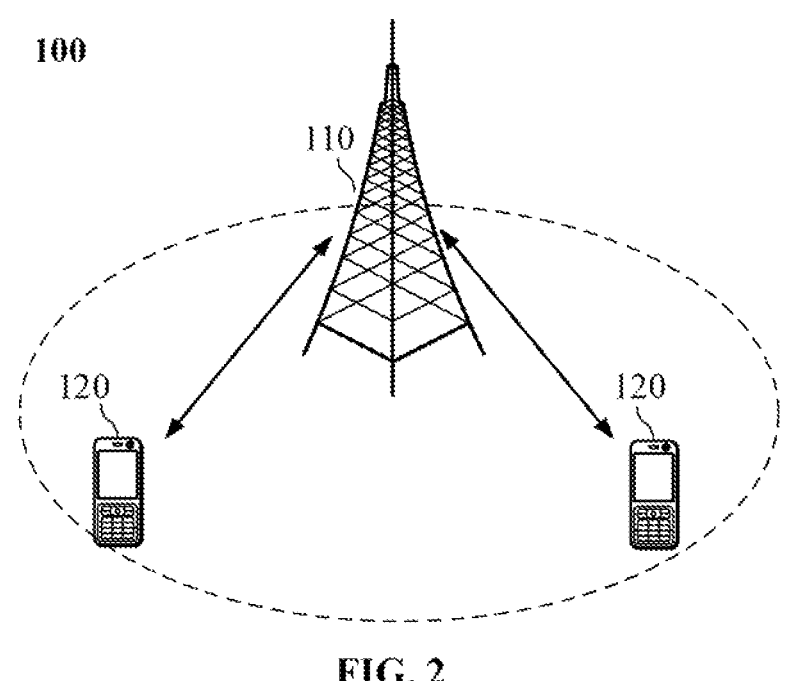
FIG. 2 is a schematic structural diagram of a communication system according to the present disclosure.

Exemplarily, the communication system 100 to which the embodiment of the present disclosure is applied is illustrated in FIG. 2. The communication system 100 may include a network device 110. The network device 110 may be a device that communicates with a terminal device 120 (or called a communication terminal or a terminal). The network device 110 may provide communication coverage for a specific geographic area, and may communicate with terminal devices located within the coverage area. In an embodiment, the network device 110 may be a Base Transceiver Station (BTS) in a GSM system or a CDMA system, or a NodeB (NB) in a WCDMA system, an Evolutional Node B (eNB or eNodeB) in an LTE system, or a wireless controller in the Cloud Radio Access Network (CRAN), or the network device may be a mobile switching center, a relay station, an access point, a vehicle-mounted device, a wearable device, a hub, a switch, a bridge, a router, a network-side device in 5G networks or a network device in the future enhanced Public Land Mobile Network (PLMN), etc.

The communication system 100 further includes at least one terminal device 120 located within the coverage of the network device 110. "Terminal" as used herein includes but is not limited to an apparatus that is configured to receive or transmit communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal device set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal device may refer to access terminals, user equipment (UE), user units, user stations, mobile stations, mobile platforms, remote stations, remote terminals, mobile device, user terminals, terminals, wireless communication device, user agents or user apparatuses. The access terminal may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, vehicle-mounted devices, wearable devices, terminals in 5G networks, or terminals in the future enhanced PLMN, etc.

In an embodiment, a communication mode of Device to Device (D2D) may be performed between the terminal devices 120.

In an embodiment, the 5G system or the 5G network may also be referred to as a New Radio (NR) system or an NR network.

As illustrated in FIG. 3, an optional processing flow of a method for switching transmission mode applied to a core network element according to an embodiment of the present disclosure includes the following operations:

At an operation S201, the core network element transmits first indication information to an UPF entity, the first indication information is used to instruct to transmit multicast data corresponding to terminal devices to a shared channel.

In the embodiment of the present disclosure, multicast data corresponding to different terminal devices in a same group may be transmitted in the shared channel.

In some embodiments, the core network element (e.g., the AMF entity or the SMF entity) receives fourth indication information transmitted by the RAN element. In a case where the fourth indication information instructs to switch a data transmission mode to multicast transmission, the AMF entity or the SMF entity transmits first indication information to the UPF entity. The first indication information is used to instruct to transmit multicast data corresponding to the terminal devices to a shared channel. For example, the first indication information instructs the UPF entity to transmit multicast data corresponding to a first terminal device and a second terminal device to a shared N3 channel.

In other embodiments, in a case where the core network element (e.g., the AMF entity or the SMF entity) determines to switch a data transmission mode to multicast transmission according to the number of terminal devices, the SMF entity transmits first indication information to the UPF entity. The first indication information is used to instruct to transmit multicast data corresponding to the terminal devices to a shared channel. For example, the first indication information instructs the UPF to transmit multicast data corresponding to a first terminal device and a second terminal device to a shared N3 channel.

At an operation S202, the core network element transmits second indication information to a radio access network (RAN) element. The second indication information is used to indicate multicast data.

In some embodiments, the core network element (e.g., the AMF entity or the SMF entity) receives fourth indication information transmitted by the RAN element. In a case where the fourth indication information instructs to switch the data transmission mode to multicast transmission, the AMF entity or the SMF entity transmits the second indication information to the RAN element.

In other embodiments, in a case where the core network element (e.g., the AMF entity or the SMF entity) determines, according to the number of the terminal devices, that a data transmission mode is switched to multicast transmission, the SMF entity transmits the second indication information to the RAN element.

In the embodiment of the present disclosure, the core network element may establish the shared N3 channel between the RAN element and the UPF entity before performing operations S201 and S202. If the core network element does not establish the shared N3 channel between the RAN element and the UPF entity, the SMF needs to establish the shared N3 channel between the RAN element and the UPF entity.

According to the embodiment of the present disclosure, before performing the operation S201, the method may further include the following operations.

At an operation S200, the core network element transmits third indication information to the RAN element. The third indication information is used to indicate that the terminal devices support multicast transmission.

In some embodiments, the third indication information is carried in an N2 message. That is, the core network element indicates to the RAN element through the N2 message that the first terminal device and the second terminal device support multicast transmission. That the first terminal device and the second terminal device support multicast transmission may also be understood as the first terminal device and the second terminal device are in a multicast transmission group.

In other embodiments, the third indication information is used not only to indicate that the terminal devices support multicast transmission, but also to indicate information of data flow and/or information of quality of service (QoS) flow for which the multicast transmission can be performed for the terminal device. The third indication information is further used to indicate information of data flow and/or information of QoS flow carrying same multicast data.

It should be noted that in the embodiment of the present disclosure, the shared channel is used only for transmitting multicast data, but cannot be used for transmitting unicast data. For example, in a case where the first terminal device includes multicast data and unicast data, the unicast data of the first terminal device is transmitted on an N3 channel corresponding to the first terminal device, and the multicast data of the first terminal device is transmitted on the shared N3 channel.

As illustrated in FIG. 4, an optional processing flow of a method for switching transmission mode applied to an RAN element according to an embodiment of the present disclosure includes the following operations.

At an operation S301, the RAN element receives second indication information transmitted by the core network element. The second indication information is used to indicate multicast data.

In some embodiments, that the second indication information is used to indicate the multicast data may be understood as the second indication information is used to indicate to the RAN element which data is the multicast data.

In some embodiments, the RAN element receives the second indication information transmitted by the core network element (e.g., the AMF entity or the SMF entity). In this scenario, the RAN element transmits fourth indication information to the core network element (e.g., the AMF entity or the SMF entity). The fourth indication information instructs to switch the data transmission mode to multicast transmission.

In other embodiments, the RAN element receives the second indication information transmitted by the core network element (SMF entity). In this scenario, the core network element (SMF entity) determines, according to the number of terminal devices, to switch the data transmission mode to the multicast transmission. Thus, before performing the operation S301, the method may further include the following operations.

At an operation S300, the RAN element determines to switch a data transmission mode to multicast transmission according to a unicast scheduling resource situation.

In some embodiments, the method may further include the following operations.

At an operation S302, after completing transmission of unicast data, the RAN element transmits multicast transmission configuration information to the terminal devices.

In the embodiment of the present disclosure, the shared N3 channel is only used to transmit the multicast data, but cannot be used to transmit the unicast data. Therefore, the RAN element may firstly transmit the unicast data and then transmit the multicast data. The RAN element may transmit the multicast transmission configuration information to the terminal device before transmitting the multicast data.

In some embodiments, the multicast transmission configuration information includes data radio bearer (DRB) information and/or access stratum (AS) layer information corresponding to multicast transmission.

In some embodiments, the method may further include the following operations.

At an operation S303, the RAN element releases a DRB and a unicast channel corresponding to unicast transmission of the terminal device.

It should be noted that, in the embodiment of the present disclosure, the core network element includes the SMF entity or the AMF entity.

For the method for switching the transmission mode illustrated in FIG. 3 and FIG. 4, an optional detailed processing flow of the method for switching the transmission mode provided in the embodiment of the present disclosure includes the following operations.

At an operation S401, the terminal device establishes or modifies a PDU session. The PDU session carries unicast transmission and multicast transmission of a corresponding DNN.

In the embodiment of the present disclosure, the N3 channel between the UPF entity and the RAN element can only be used to transmit unicast data, that is, the N3 channel between the UPF entity and the RAN element can only be used for unicast transmission of the data. Therefore, it is necessary to establish a channel for multicast transmission.

At an operation S402, in the process of establishing or modifying the PDU session, the core network element indicates to the RAN element through an N2 message that the first terminal device and the second terminal device support multicast transmission.

In some embodiments, that the first terminal device and the second terminal device support multicast transmission means that the first terminal device and the second terminal device are within a same transmission group.

In some embodiments, the core network element may further indicate, information of data flow and/or information of QoS flow for which multicast transmission can be performed in PDU sessions of the first terminal device and the second terminal device, to the RAN element through the N2 message. The core network element may further indicate, information of data flow and/or information of QoS flow carrying the same multicast data, to the RAN element through the N2 message.

In some embodiments, one shared N3 channel for multicast transmission may be established between the UFP entity and the RAN element, and the shared N3 channel is used for performing multicast transmission for the first terminal device and the second terminal device.

At an operation S403, the network device determines to switch data transmission modes of the first terminal device and the second terminal device to a multicast mode.

In some embodiments, the RAN element determines to switch data transmission modes of the first terminal device and the second terminal device to a multicast mode according to a unicast scheduling resource situation of the first terminal device and the second terminal device. The RAN element then transmits indication information to the core network element (e.g., the AMF entity or the SMF entity) indicating that the data transmission modes of the first terminal device and the second terminal device are required to be switched to the multicast mode. If the shared N3 channel for multicast transmission is not established at the operation S401, the SMF entity firstly establishes the shared N3 channel for multicast transmission; and if the shared N3 channel for multicast transmission has been established at the operation S401, the AMF entity or the SMF entity instructs the corresponding UPF entity to schedule and transmit multicast data corresponding to the first terminal device and the second terminal device to the shared N3 channel. The AMF entity or the SMF entity further instructs the RAN element to switch data transmission to the shared N3 channel. After receiving the indication transmitted by the AMF entity or the SMF entity, the UPF transmits the multicast data of the first terminal device and the second terminal device to the shared N3 channel for transmitting to the RAN element. After completing transmission of buffered unicast transmission data, the RAN element may configure the terminal device to perform multicast transmission. For example, DRB information and other AS layer information corresponding to the performing of the multicast transmission are configured for the terminal device. After completing transmission of unicast transmission data, the RAN element may release the DRB and N3 channel corresponding to unicast transmission of the first terminal device and the second terminal device.

In other embodiments, a core network element (e.g., the AMF entity or the SMF entity), determines to switch a data transmission mode to multicast transmission according to the number of terminal devices in a multicast transmission group. The SMF entity notifies the UPF entity of switching the transmission mode to the multicast mode, and the UPF entity transmits the downlink data to the shared N3 channel. The SMF entity may notify the RAN element in advance of receiving data on the shared N3 channel. Here, if the shared N3 channel for multicast transmission is not established at the operation S401, the SMF entity needs to firstly establish the shared N3 channel for multicast transmission.

At an operation S404, the SMF entity initiates a PDU session modification procedure, and modifies the PDU session of the first terminal device and the PDU session of the second terminal device into a multicast transmission session.

Figure 5:
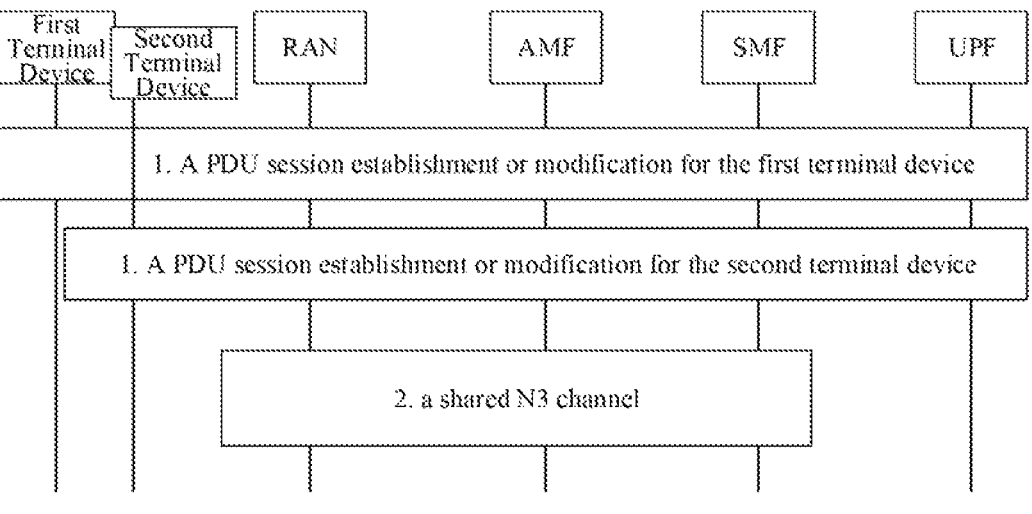
FIG. 5 is a schematic diagram of processing flow of a method for switching transmission mode according to an embodiment of the present disclosure.

An embodiment of the present disclosure provides an implementation method for switching a data transmission mode from unicast transmission to multicast transmission. As illustrated in FIG. 5, an RAN element or a core network element determines to switch a data transmission mode to multicast transmission. Further, the shared channel of the multicast transmission is used only for transmitting the multicast data, but cannot be used for transmitting the unicast data.

As illustrated in FIG. 6, another optional processing flow of a method for switching transmission mode applied to an RAN element according to an embodiment of the present disclosure includes the following operations.

At an operation S501, the RAN element determines to switch a data transmission mode to multicast transmission.

In some embodiments, the RAN element determines to switch the data transmission mode to the multicast transmission according to a local policy.

In the embodiment of the present disclosure, during the multicast transmission, both unicast data and multicast data corresponding to different terminal devices in a same group can be transmitted in the shared channel.

At an operation S502, the RAN element performs data scheduling according to data sequence numbers for the terminal device.

In the embodiment of the present disclosure, the shared channel may transmit both multicast data and unicast data. Thus, in some embodiments, the RAN element may schedule unicast data and multicast data in the shared channel in an ascending order of all data sequence numbers. The RAN element may also schedule the unicast data in the shared channel in an ascending order of unicast data sequence numbers, and then schedule the multicast data in the shared channel in an ascending order of multicast data sequence numbers.

For example, in a case where the first terminal device has established a session connection, and the second terminal device joins the multicast transmission, data that are transmitted by the UPF entity to data channels of the first terminal device and the second terminal device and that can be multicast scheduled have the same sequence number (SN). The RAN element performs multicast scheduling on data of the same SN.

In some embodiments, the method further includes the following operations.

At an operation S500, the RAN element receives fifth indication information transmitted by the core network element. The fifth indication information is used to indicate that the terminal devices support multicast transmission.

In some embodiments, the fifth indication information is further used to indicate information of data flow and/or information of quality of service (QoS) flow for which the multicast transmission can be performed for the terminal devices. The fifth indication information is further used to indicate information of data flow and/or information of QoS flow carrying the same multicast data.

In some embodiments, the method further includes the following operations.

At an operation S503, the RAN element configures multicast transmission resources for the terminal devices, and the multicast transmission resources are used for transmitting multicast data.

With respect to the method for switching the transmission mode illustrated in FIG. 6, a detailed processing flow of another transmission mode switching method provided in an embodiment of the present disclosure includes the following operations.

At an operation S601, the terminal device establishes or modifies a PDU session, and the PDU session may carry unicast transmission and multicast transmission of the respective DNN.

In the embodiment of the present disclosure, the N3 channel between the UPF entity and the RAN element can be used not only for transmitting unicast data but also for transmitting multicast data. That is, the N3 channel between the UPF entity and the RAN element can be used not only for unicast transmission of data, but also for multicast transmission of data.

At an operation S602, in the process of establishing or modifying the PDU session, the core network element indicates to the RAN element through the N2 message that the first terminal device and the second terminal device can perform the multicast transmission.

In some embodiments, that the first terminal device and the second terminal device can perform the multicast transmission means that the first terminal device and the second terminal device are within the same transmission group.

In some embodiments, the core network element may further indicate, information of data flow and/or information of QoS flow for which multicast transmission can be performed in PDU sessions of the first terminal device and the second terminal device, to the RAN element through N2 message. The core network element may further indicate information of data flow and/or information of QoS flow carrying the same multicast data to the RAN element through the N2 message.

In the embodiment of the present disclosure, the UPF entity may add data sequence numbers (SNs) available for multicast transmission to downlink data, and the data SNs of the multicast transmission are used by the RAN element for multicast scheduling. For example, if the first terminal device has established a session connection, and the second terminal device joins the multicast transmission, data that is transmitted by the UPF entity to the data channel of the first terminal device and the data channel of the second terminal device and that can be multicast scheduled may use a same SN number. The RAN element can perform multicast scheduling for the data of the same SN.

At an operation S603, the RAN network element determines to switch a data transmission mode to multicast transmission according to a local policy.

In some embodiments, the RAN element configures multicast transmission resources for the first terminal device and the second terminal device, and the multicast transmission resources are used for performing multicast data transmission.

At an operation S604, the RAN element performs multicast scheduling.

Figure 7:
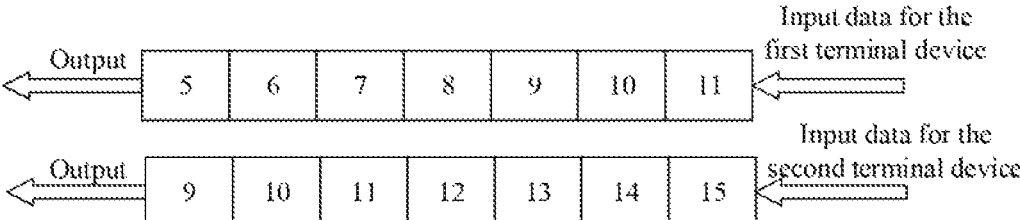
FIG. 7 is a schematic diagram of data transmission according to an embodiment of the present disclosure.

In some embodiments, in order to reduce the data loss in the data transmission mode switching procedure, after the RAN element switches to the multicast transmission, the multicast scheduling may be started from the data whose SN is the smallest among the data for the first terminal device and the data for the second terminal device. Taking the data illustrated in FIG. 7 as an example, the SNs of the data for the first terminal device is 5, 6, 7, 8, 9, 10, and 11, respectively, and the SNs of the data for the second terminal device is 9, 10, 11, 12, 13, 14, and 15, respectively. In a data scheduling mode, the RAN element performs sequentially scheduling from the data whose SN is 5. Since the minimum value of SN of the second terminal device is 9, the second terminal device performs repeated detection on data which is received before the data whose SN is 9. In the repeated detection procedure, if the second terminal device detects that the second terminal device has received data with a same SN, the data is discarded. In another data scheduling mode, the RAN element continues performing unicast scheduling on the first terminal device, and after all the data whose SN number is 5, 6, 7 and 8 respectively in the first terminal device are transmitted, the RAN element performs multicast scheduling on the data whose SN is 9.

Figure 8:
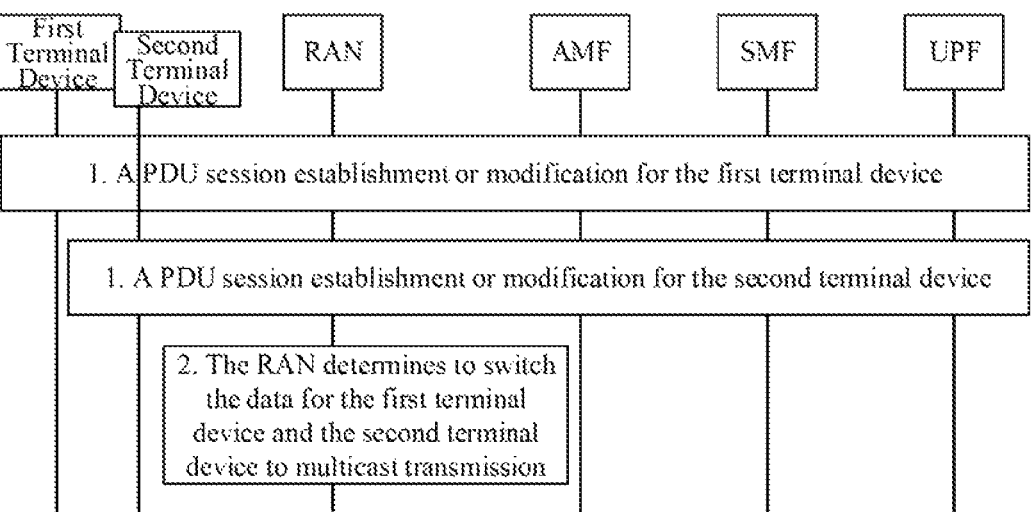
FIG. 8 is a schematic diagram of another processing flow of a method for switching transmission mode according to an embodiment of the present disclosure.

An embodiment of the present disclosure provides an implementation method for switching a data transmission mode from unicast transmission to multicast transmission. As illustrated in FIG. 8, the RAN element may determine to switch a data transmission mode to multicast transmission. Further, the shared channel of the multicast transmission can be used not only for transmitting the multicast data, but also for transmitting the unicast data.

Figure 9:
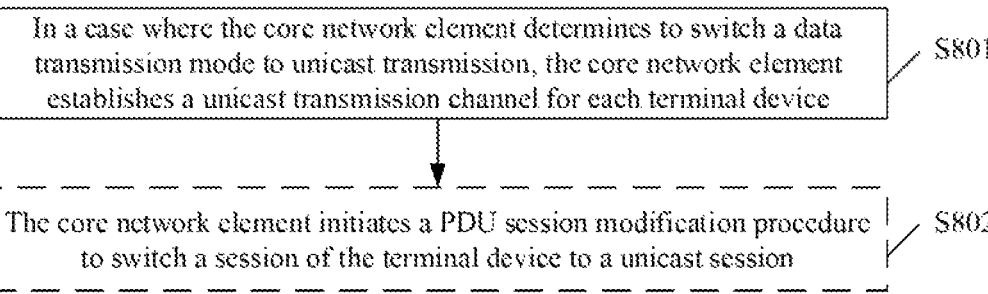
FIG. 9 is a schematic diagram of another optional processing flow of a method for switching transmission mode applied to a core network element according to an embodiment of the present disclosure.

As illustrated in FIG. 9, another optional processing flow of a method for switching transmission mode applied to a core network element according to an embodiment of the present disclosure includes the following operations.

At an operation S801, when a core network element determines to switch a data transmission mode to unicast transmission, the core network element establishes a unicast transmission channel for each terminal device.

In some embodiments, the core network element (e.g., the SMF entity or the AMF entity) determines to switch a data transmission mode to unicast transmission according to the number of terminal devices in a multicast transmission group.

In other embodiments, the core network element (e.g., the SMF entity or the AMF entity) receives sixth indication information transmitted by the RAN element. The sixth indication information is used to instruct to switch the data transmission mode to unicast transmission. In this scenario, the RAN element determines to switch the data transmission mode to unicast transmission according to the resource usage situation of the multicast transmission or the feedback information of terminal devices in a multicast transmission group. The sixth indication information includes information of a multicast transmission group of the terminal devices, such as an identifier of a multicast transmission group in which the terminal devices are located. The sixth indication information may include identification information of the terminal devices in addition to information of the multicast transmission group of the terminal device.

In some embodiments, the operation that the core network element establishes a unicast transmission channel for each terminal device includes the following operations. The core network element (e.g., the SMF entity) transmits seventh indication information to an RAN element. The seventh indication information is used to instruct the RAN element to establish a unicast transmission channel and allocate a downlink address of the unicast transmission channel. The core network element (e.g., the SMF entity) transmits eighth indication information to the UPF entity. The eighth indication information is used to indicate the downlink address of the unicast transmission channel.

In some embodiments, the method further includes the following operations.

At an operation S802, the core network element initiates a PDU session modification procedure to switch a session of the terminal device to a unicast session.

In some embodiments, the core network element is an SMF entity.

With respect to the method for switching the transmission mode illustrated in FIG. 9, a detailed processing flow of another transmission mode switching method provided in an embodiment of the present disclosure includes the following operations.

At an operation S901, the first terminal device and the second terminal device transmit data in a manner of multicast transmission.

At an operation S902, the network-side device determines to switch a data transmission mode from multicast transmission to unicast transmission.

In some embodiments, the RAN element determines to switch a data transmission mode from the multicast transmission to the unicast transmission according to the resource usage situation of the current multicast transmission or according to the feedback information of terminal devices. The RAN element transmits indication information to the core network element (e.g., the AMF entity or the SMF entity) to instruct to switch the data transmission mode to the unicast mode, and the indication information may carry information of a multicast transmission group in which the first terminal device and the second terminal device are located. In an embodiment, the indication information may further carry identification information of the first terminal device and identification information of the second terminal device. The core network element (e.g., the SMF entity) initiates an N3 channel establishment procedure of the first terminal device and an N3 channel establishment procedure of the second terminal device. After the N3 channel of the first terminal device and the N3 channel of the second terminal device are established, the RAN element starts to receive data on the N3 channel of the first terminal device and data on the N3 channel of the second terminal device, respectively.

In other embodiments, a core network element (e.g., the AMF entity or the SMF entity) determines to switch a data transmission mode from multicast transmission to unicast transmission according to the number of terminal devices in a multicast transmission group. The core network element (e.g., the SMF entity) switches the data transmission mode to multicast mode through a UPF entity. The core network element (e.g., the SMF entity) initiates an N3 channel establishment procedure of the first terminal device and an N3 channel establishment procedure of the second terminal device.

In the embodiment of the present disclosure, the specific implementation procedure of initiating by the SMF entity an N3 channel establishment procedure of the terminal device includes the following operations. The SMF entity notifies the RAN element to establish the N3 channel through the N2 message, and notifies the RAN element to allocate a downlink receiving address of the N3 channel. The SMF entity then notifies the UPF entity of the downlink receiving address of the N3 channel through N4 signaling.

At an operation S903, the SMF entity initiates a PDU session modification procedure, and modifies the session of the first terminal device and the session of the second terminal device into a unicast transmission session.

Figure 10:
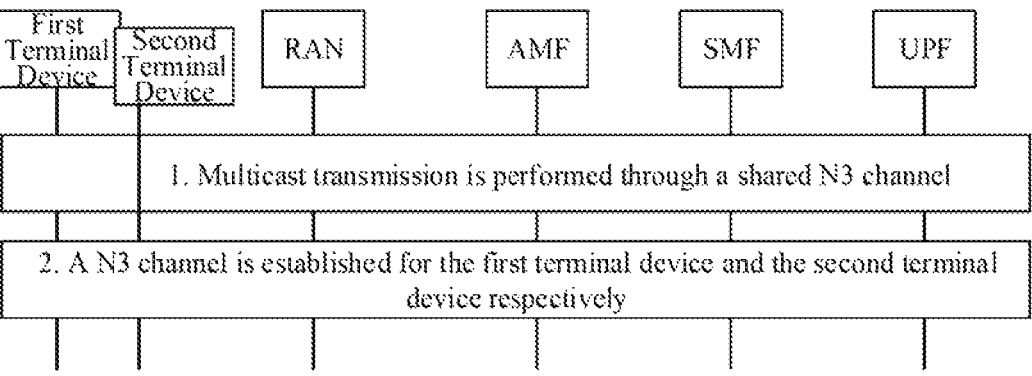
FIG. 10 is a schematic diagram of another processing flow of a method for switching transmission mode according to an embodiment of the present disclosure.

An embodiment of the present disclosure provides an implementation method for switching a data transmission mode from multicast transmission to unicast transmission. As illustrated in FIG. 10, an RAN element or a core network element may determine to switch a data transmission mode to unicast transmission.

Figure 11:
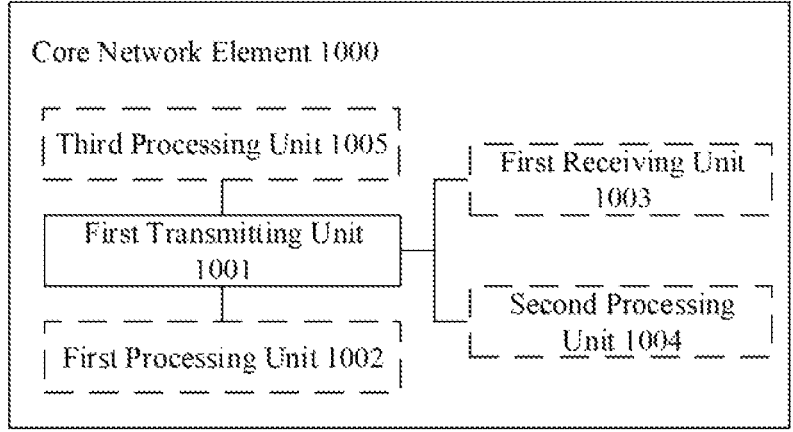
FIG. 11 is a schematic diagram of an optional composition structure of a core network element according to an embodiment of the present disclosure.

To implement the method for switching the transmission mode, an embodiment of the present disclosure provides a core network element. As illustrated in FIG. 11, the composition structure of the core network element 100) includes a first transmitting unit 1001.

The first transmitting unit 1001 is configured to transmit first indication information to a UPF entity, and transmit second indication information to an RAN element. The first indication information is used to instruct to transmit multicast data corresponding to terminal devices to a shared channel, and the second indication information is used to indicate multicast data.

In some embodiments, the first transmitting unit 1001 is further configured to transmit third indication information to the RAN element, the third indication information is used to indicate that the terminal devices support multicast transmission.

In some embodiments, the third indication information is further used to indicate information of data flow and/or information of quality of service (QoS) flow for which the multicast transmission can be performed for the terminal devices.

In some embodiments, the third indication information is further used to indicate information of data flow and/or information of QoS flow carrying same multicast data.

In some embodiments, the core network element 1000 further includes a first processing unit 1002 configured to establish a shared channel between the RAN element and the UPF entity.

In some embodiments, the core network element 1000 further includes a first receiving unit 1003 configured to receive fourth indication information transmitted by the RAN element, the fourth indication information is used to instruct to switch the data transmission mode to multicast transmission.

In some embodiments, the core network element 1000 further includes a second processing unit 1004 configured to determine to switch a data transmission mode to multicast transmission according to the number of the terminal devices.

In some embodiments, the core network element 1000 further includes a third processing unit 1005 configured to initiate a protocol data unit (PDU) session modification procedure to switch sessions of the terminal devices to a multicast session.

In some embodiments, the core network element 1000 includes an SMF entity or an AMF entity.

In some embodiments, the shared channel is used only to transmit multicast data.

Figure 12:
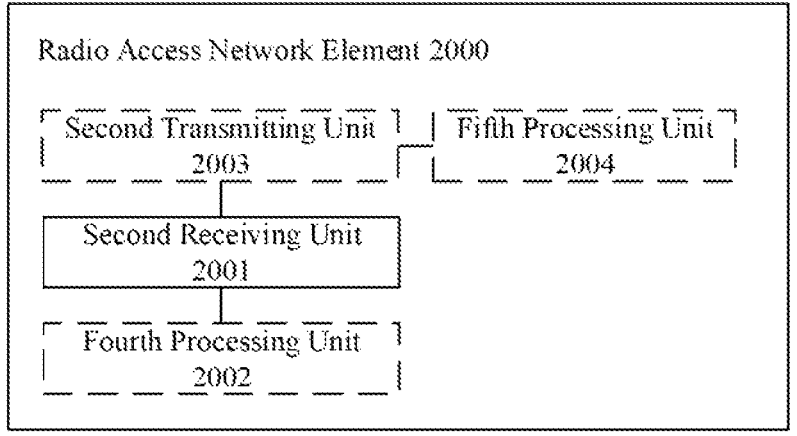
FIG. 12 is a schematic structural diagram of an optional composition structure of an RAN element according to an embodiment of the present disclosure.

To implement the method for switching the transmission mode, an embodiment of the present disclosure provides an RAN element 2000. As illustrated in FIG. 12, the composition structure of the RAN element 2000 includes a second receiving unit 2001.

The second receiving unit 2001 is configured to receive second indication information transmitted by a core network element, the second indication information is used to indicate multicast data.

In some embodiments, the RAN element 2000 further includes a fourth processing unit 2002.

The fourth processing unit 2002 is configured to determine to switch a data transmission mode to multicast transmission according to a unicast scheduling resource situation.

In some embodiments, the RAN element 2000 further includes a second transmitting unit 2003.

The second transmitting unit 2003 is configured to transmit multicast transmission configuration information to the terminal device after completing transmission of unicast data.

In some embodiments, the multicast transmission configuration information includes DRB information and/or AS layer information corresponding to multicast transmission.

In some embodiments, the RAN element 2000 further includes a fifth processing unit 2004.

The fifth processing unit 2004 is configured to release a DRB and a unicast channel corresponding to the unicast transmission of the terminal device.

In some embodiments, the core network element includes an SMF entity or an AMF entity.

In some embodiments, the shared channel is used only to transmit multicast data.

Figure 13:
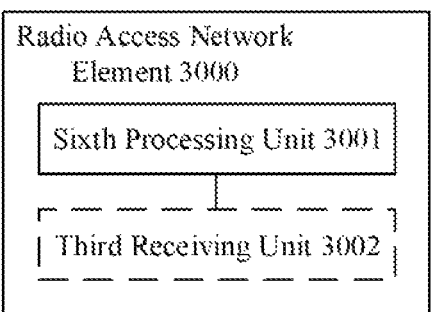
FIG. 13 is a schematic structural diagram of another optional composition structure of an RAN element according to an embodiment of the present disclosure.

In order to implement the method for switching the transmission mode, an embodiment of the present disclosure provides another RAN element. A composition structure of the RAN element 3000 is illustrated in FIG. 13. The RAN element 3000 includes a sixth processing unit 3001.

The sixth processing unit 3001 is configured to determine to switch a data transmission mode to multicast transmission, and perform data scheduling according to data sequence numbers for the terminal devices.

In some embodiments, the sixth processing unit 3001 is further configured to configure multicast transmission resources for the terminal devices, the multicast transmission resources are used for transmitting multicast data.

In some embodiments, the sixth processing unit 3001 is further configured to firstly schedule unicast data in a shared channel in an ascending order of sequence numbers of the unicast data, and then schedule multicast data in the shared channel in an ascending order of sequence numbers of the multicast data.

In some embodiments, the multicast data has the same data sequence number.

In some embodiments, the sixth processing unit 3001 is configured to determine to switch a data transmission mode to multicast transmission according to a local policy.

In some embodiments, the RAN element 3000 further includes a third receiving unit 3002.

The third receiving unit 3002 is configured to receive fifth indication information transmitted by a core network element, and the fifth indication information is used to indicate that the terminal devices support multicast transmission.

In some embodiments, the fifth indication information is further used to indicate information of data flow and/or information of QoS flow for which the multicast transmission can be performed for the terminal devices.

In some embodiments, the fifth indication information is further used to indicate information of data flow and/or information of QoS flow carrying same multicast data.

Figure 14:
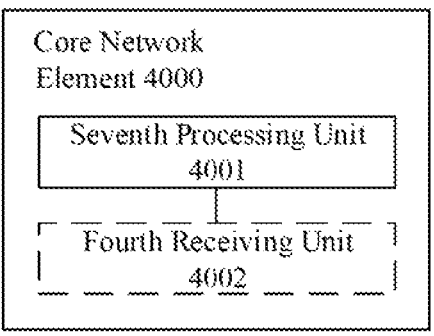
FIG. 14 is a schematic diagram of another optional composition structure of a core network element according to an embodiment of the present disclosure.

In order to implement the method for switching the transmission mode described above, an embodiment of the present disclosure provides another core network element. A composition structure of the core network element 4000 is illustrated in FIG. 14. The core network element 4000 includes a seventh processing unit 4001.

The seventh processing unit 4001 is configured to, in a case of determining to switch a data transmission mode to unicast transmission, establish a unicast transmission channel for each terminal device.

In some embodiments, the seventh processing unit 4001 is further configured to determine to switch a data transmission mode to unicast transmission according to the number of terminal devices in a multicast transmission group.

In some embodiments, the core network element 4000 further includes a fourth receiving unit 4002.

The fourth receiving unit 4002 is configured to receive sixth indication information transmitted by the RAN element, and the sixth indication information is used to instruct to switch the data transmission mode to unicast transmission.

The data transmission mode is determined by the RAN element according to a resource usage situation of multicast transmission or feedback information of terminal devices in a multicast transmission group.

In some embodiments, the sixth indication information includes information of a multicast transmission group of the terminal devices.

In some embodiments, the sixth indication information further includes identification information of the terminal devices.

In some embodiments, the seventh processing unit 4001 is configured to transmit seventh indication information to an RAN element, and transmit eighth indication information to a UPF entity. The seventh indication information is used to instruct the RAN element to establish a unicast transmission channel and allocate a downlink address of the unicast transmission channel, and the eighth indication information is used to indicate a downlink address of the unicast transmission channel.

In some embodiments, the seventh processing unit 4001 is further configured to initiate a PDU session modification procedure to switch a session of the terminal device to a unicast session.

In some embodiments, the core network element 40K includes an SMF entity.

An embodiment of the present disclosure further provides a core network element including a processor and a memory for storing a computer program executable on the processor, the processor is configured to execute the computer program to perform operations of the method for switching the transmission mode performed by the core network element.

An embodiment of the present disclosure further provides a core network element including a processor and a memory for storing a computer program executable on the processor, the processor is configured to execute the computer program to perform operations of the method for switching the transmission mode performed by the core network element.

An embodiment of the present disclosure further provides an RAN element including a processor and a memory for storing a computer program executable on the processor, the processor is configured to execute the computer program to perform operations of the method for switching the transmission mode performed by the RAN element.

An embodiment of the present disclosure further provides a chip including a processor for invoking and executing a computer program from a memory, so that a device on which the chip is mounted performs the method for switching the transmission mode performed by the core network element.

An embodiment of the present disclosure further provides a chip including a processor for invoking and executing a computer program from a memory, so that a device on which the chip is mounted performs the method for switching the transmission mode performed by the RAN element.

An embodiment of the present disclosure further provides a storage medium storing an executable program which, when executed by a processor, implements a method for switching transmission mode executed by the core network element.

An embodiment of the present disclosure further provides a storage medium storing an executable program which, when executed by a processor, implements a method for switching transmission mode performed by the RAN element.

An embodiment of the present disclosure further provides a computer program product including computer program instructions that cause a computer to perform the method for switching the transmission mode performed by the core network element.

An embodiment of the present disclosure further provides a computer program product including computer program instructions that cause a computer to perform the method for switching the transmission mode performed by the RAN element.

An embodiment of the present disclosure further provides a computer program that causes a computer to perform the method for switching the transmission mode performed by the core network element.

An embodiment of the present disclosure further provides a computer program that causes a computer to perform the method for switching the transmission mode performed by the RAN element.

A method for switching transmission mode provided in an embodiment of the present disclosure includes the following operations. A core network element transmits first indication information to a user plane function entity, the first indication information is used to instruct to transmit multicast data corresponding to terminal devices to a shared channel. The core network element transmits second indication information to an RAN element, the second indication information is used to indicate multicast data. As such, switching data transmission from unicast transmission to multicast transmission and switching data transmission from multicast to unicast transmission are achieved.

Figure 15:
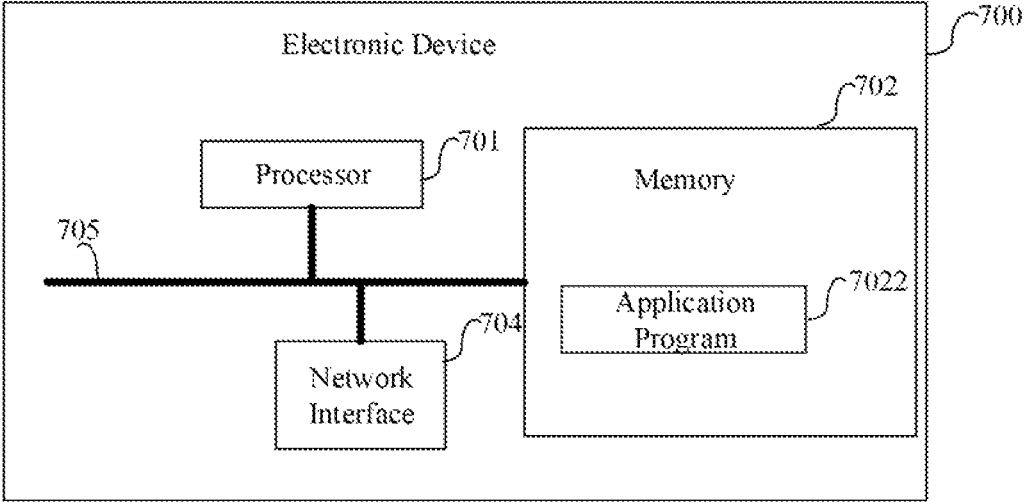
FIG. 15 is a schematic diagram of a hardware composition structure of an electronic device according to an embodiment of the present disclosure.

FIG. 15 is a schematic diagram of a hardware composition structure of an electronic device (a core network element and an RAN element) according to an embodiment of the present disclosure. The electronic device 700 includes at least one processor 701, a memory 702, and at least one network interface 704. The various components in the electronic device 700 are coupled together by a bus system 705. It will be appreciated that the bus system 705 is used to implement connection and communication between these components. The bus system 705 includes a power bus, a control bus, and a status signal bus in addition to a data bus. However, for clarity of illustration, various buses are labeled as a bus system 705 in FIG. 15.

It can be understood as the memory 702 may be a volatile memory or a non-volatile memory, or may include both volatile and non-volatile memory. Among them, the non-volatile memory may be a read-only memory (ROM), a programmable ROM (PROM), an erasable PROM (EPROM), an electrically EPROM (EEPROM), a ferromagnetic random access memory (FRAM), a flash memory, a magnetic surface memory, an optical disc, or a compact disc read-only memory (CD-ROM). The FRAM may be a magnetic disk memory or a magnetic tape memory. The volatile memory may be a random access memory (RAM), which is used as an external cache. By way of exemplary but not restrictive description, many forms of RAM are available, such as static RAMs (SRAM), synchronous static random access memory (SSRAM), dynamic RAMs (DRAM), synchronous DRAMs (SDRAM), double data rate SDRAMs (DDR SDRAM), enhanced SDRAMs (ESDRAM), synchlink DRAMs (SLDRAM)) and direct rambus RAMs (DR-RAM). It should be noted that the memory 702 described herein are intended to include, but are not limited to these and any other suitable types of memory.

The memory 702 in the present embodiment is used to store various types of data to support operations of the electronic device 700. Examples of such data include any computer programs, such as application program 7022, for operating on electronic device 700. A program implementing the method of the present embodiment may be included in the application program 7022.

The method disclosed above in the present embodiment may be applied to, or implemented by, the processor 701. Processor 701 may be an integrated circuit chip having signal processing capabilities. In implementation, the operations of the above method may be accomplished by integrated logic circuitry of hardware in a processor 701 or indications in the form of software. The processor 701 may be a general purpose processor, a digital signal processor (DSP), or other programmable logic device, a discrete gate or transistor logic device, or a discrete hardware component. The methods, operations, and logical block diagrams disclosed in the embodiments of the present disclosure may be implemented or performed by the processor 701. The general purpose processor may be a microprocessor or any conventional processor or the like. The operations of the method disclosed in connection with the embodiments of the present disclosure may be directly performed by a hardware decoding processor, or performed by a combination of hardware and software modules in the decoding processor. The software module may be located in a storage medium. The storage medium is located in the memory 702, and the processor 701 reads the information in the memory 702 and completes the operations of the method in combination with the hardware.

In an exemplary embodiment, the electronic device 700 may be implemented by one or more application specific integrated circuits (ASICs), DSPs, programmable logic devices (PLDs), complex programmable logic devices (CPLDs), FPGAs, general purpose processors, controllers, MCUs, MPUs, or other electronic components for performing the foregoing methods.

The present disclosure is described with reference to flowcharts and/or block diagrams of methods, devices (systems), and computer program products according to embodiments of the present disclosure. It will be appreciated that each flow and/or block in the flow and/or block diagram and the combination of the flow and/or block in the flow and/or block diagram may be implemented by computer program instructions. These computer program instructions may be provided to a processor of a general purpose computer, a dedicated computer, an embedded processor, or other programmable data processing device to generate a machine such that instructions executed by the processor of the computer or other programmable data processing device generate means for implementing the functions specified in one or more of the flow charts and/or one or more of the block diagrams.

The computer program instructions may also be stored in a computer-readable memory capable of directing a computer or other programmable data processing device to operate in a particular manner, such that the instructions stored in the computer-readable memory produce manufactured articles including instructions that implement the functions specified in one or more of the flow charts and/or in one or more of the block diagrams.

The computer program instructions may also be loaded onto a computer or other programmable data processing device such that a series of operational operations are performed on the computer or other programmable device to generate computer-implemented processing such that the indications performed on the computer or other programmable device provide operations for implementing the functions specified in one or more of the flow charts and/or the block diagrams.

The foregoing description is merely a preferred embodiment of the present disclosure and is not intended to limit the scope of protection of the present disclosure. Any modifications, equivalent replacements and modifications made within the spirit and principles of the present disclosure shall fall within the scope of protection of the present disclosure.

The invention claimed is:

1. A method performed by a core network (CN) element, the method comprising:
   determining to switch, by the CN element, a data transmission mode from a unicast transmission mode to a multicast transmission mode;
   transmitting, by the CN element to a user plane function (UPF) entity, first indication information instructing the UPF entity to transmit, to a shared N3 channel, multicast data corresponding to terminal devices in a multicast group; and
   transmitting, by the CN element and to a radio access network (RAN) element, second indication information indicating the multicast data;
   wherein the terminal devices have been respectively receiving unicast data within a same packet data unit (PDU) session on data flows or quality of service (QoS) flows for which multicast transmission can be performed and that carry same multicast data.

2. The method of claim 1, further comprising:
   transmitting, by the CN element and to the RAN element, third indication information indicating that the terminal devices support reception of multicast transmission.

3. The method of claim 2, wherein the third indication information further indicates information of a data flow or information of a quality of service (QoS) flow for which the multicast transmission can be performed for the terminal devices.

4. The method of claim 3, wherein the third indication information further indicates information about the data flow or information about the QoS flow carrying same multicast data.

5. The method of claim 1, further comprising:
   establishing, by the CN element, the shared N3 channel between the RAN element and the UPF entity.

6. The method of claim 1, wherein the determining to switch the data transmission mode is based on a fourth indication information received from the RAN element.

7. The method of claim 1, wherein the determining to switch the data transmission mode is based on a number of the terminal devices.

8. The method of claim 1, further comprising:
   initiating, by the CN element, a PDU session modification procedure to switch sessions for the terminal devices to a multicast session.

9. The method of claim 8, wherein the initiating the PDU session modification procedure is performed by a session management function (SMF) entity of the CN element.

10. The method of claim 8, further comprising:
    initiating, by the CN element, another PDU session procedure to switch a session for at least one of the terminal devices to a unicast session.

11. A core network (CN) element comprising:
    a processor; and
    a memory for storing a computer program executable on the processor;
    wherein the processor is configured to execute the computer program to:
       determine to switch a data transmission mode from a unicast transmission mode to a multicast transmission mode;
       transmit, to a user plane function (UPF) entity, first indication information instructing the UPF entity to transmit, to a shared N3 channel, multicast data corresponding to terminal devices in a multicast transmission group; and
       transmit, to a radio access network (RAN) element, second indication information information indicating the multicast data;
    wherein the terminal devices have been respectively receiving unicast data within a same packet data unit (PDU) session on data flows or quality of service (QoS) flows for which multicast transmission can be performed and that carry same multicast data.

12. The CN element of claim 11, wherein the processor is further configured to execute the computer program to:
    transmit, to the RAN element, third indication information indicating that the terminal devices support reception of multicast transmission.

13. The CN element of claim 12, wherein the third indication information further indicates information of a data flow or information of a quality of service (QoS) flow for which the multicast transmission can be performed for the terminal devices.

14. The CN element of claim 13, wherein the third indication information further indicates information about the data flow or information about the QoS flow carrying same multicast data.

15. The CN element of claim 11, wherein the processor is further configured to execute the computer program to:
    establish the shared N3 channel between the RAN element and the UPF entity.

16. The CN element of claim 11, wherein the processor is further configured to execute the computer program to:
    determine to switch the data transmission mode based on a fourth indication information received from the RAN element.

17. The CN element of claim 11, wherein the processor is further configured to execute the computer program to:
    determine to switch the data transmission mode based on a number of the terminal devices.

18. The CN element of claim 11, wherein the processor is further configured to execute the computer program to:
    initiate a PDU session modification procedure to switch sessions for the terminal devices to a multicast session.

19. The CN element of claim 18, wherein the PDU session modification procedure is initiated by a session management function (SMF) entity of the CN element.

20. The CN element of claim 18, wherein the processor is further configured to execute the computer program to:

initiate another PDU session procedure to switch a session for at least one of the terminal devices to a unicast session.

\* \* \* \* \*